United States Patent
Zhou

(10) Patent No.: US 12,489,354 B2
(45) Date of Patent: Dec. 2, 2025

(54) DROPOUT VOLTAGE GENERATION CIRCUIT, SWITCHING POWER SUPPLY AND DROPOUT VOLTAGE GENERATION METHOD

(71) Applicant: Joulwatt Technology Co., Ltd., Hangzhou (CN)

(72) Inventor: Yin Zhou, Hangzhou (CN)

(73) Assignee: JOULWATT TECHNOLOGY (HANGZHOU) CO., LTD, Hangzhou (CN)

( * ) Notice: Subject to any disclaimer, the term of this patent is extended or adjusted under 35 U.S.C. 154(b) by 243 days.

(21) Appl. No.: 18/208,237

(22) Filed: Jun. 9, 2023

(65) Prior Publication Data

US 2023/0412075 A1  Dec. 21, 2023

(51) Int. Cl.
*H02M 1/00* (2007.01)
*G05F 3/26* (2006.01)

(52) U.S. Cl.
CPC .......... *H02M 1/0025* (2021.05); *G05F 3/26* (2013.01)

(58) Field of Classification Search
CPC .............................. H02M 1/0025; G05F 3/26
See application file for complete search history.

(56) References Cited

U.S. PATENT DOCUMENTS

| | | | | |
|---|---|---|---|---|
| 9,473,027 | B2 * | 10/2016 | Dong | H02M 3/158 |
| 10,088,857 | B1 * | 10/2018 | Zhang | G05F 1/575 |
| 10,345,841 | B1 * | 7/2019 | Jones, III | G01R 31/2884 |
| 10,498,234 | B2 * | 12/2019 | Liu | H02M 3/156 |
| 2003/0107358 | A1 * | 6/2003 | Isham | H02M 3/156 323/283 |
| 2015/0263615 | A1 * | 9/2015 | Moon | H02M 3/158 323/266 |
| 2017/0025950 | A1 * | 1/2017 | Wu | H02M 3/1584 |
| 2021/0111706 | A1 * | 4/2021 | Satoh | H03H 11/28 |
| 2022/0103072 | A1 * | 3/2022 | Lee | H02M 1/0032 |
| 2023/0084920 | A1 * | 3/2023 | Nakatani | G05F 1/567 327/538 |
| 2023/0138397 | A1 * | 5/2023 | Jiang | H02M 3/158 363/13 |

FOREIGN PATENT DOCUMENTS

| | | |
|---|---|---|
| CN | 115149804 | 10/2022 |
| CN | 115250070 | 10/2022 |

* cited by examiner

*Primary Examiner* — Harry R Behm
(74) *Attorney, Agent, or Firm* — Treasure IP group, LLC

(57) ABSTRACT

The present disclosure provides a droop voltage generation circuit, a switching power supply and a droop voltage generation method. The circuit includes a reference current generation unit, a first regulation unit and a second regulation unit. The reference current generation unit is configured to generate a plurality of reference currents according to the output current of the switching power supply. The first regulation unit is configured to generate a regulation current according to a first regulation code and the plurality of reference currents. The second regulation unit is configured to generate the droop voltage according to a second regulation code and the regulation current, wherein the first regulation code and the second regulation code can be configured at least according to a target value of load line resistance. The present disclosure achieves higher accuracy and wider range of regulation of load line resistance with adjustable gain.

17 Claims, 4 Drawing Sheets

DROPOUT VOLTAGE GENERATION CIRCUIT, SWITCHING POWER SUPPLY AND DROPOUT VOLTAGE GENERATION METHOD

CROSS-REFERENCE TO RELATED APPLICATION

This application claims priority to the Chinese Patent Application No. 202210687732.7, filed on Jun. 16, 2022, entitled "droop voltage generation circuit, switching power supply and drop out voltage generation method", and published as CN115833583A on Mar. 21, 2023, which is incorporated herein by reference in its entirety in this disclosure.

FIELD OF TECHNOLOGY

The present disclosure relates to a field of power electronics, and in particular, to a droop voltage generation circuit, a switching power supply and a droop voltage generation method.

DESCRIPTION OF THE RELATED ART

In switching power supplies, especially in power supply for processor applications, an output voltage of the switching power supply needs to be regulated according to a change of a load current, for example, a value of an output voltage Vout of the switching power supply needs to be set to decrease linearly as a load current Iload becomes larger, as shown in FIG. 4. The slope of this line may be used to represent a load line resistance.

In practical applications, it is required that the load line resistance be configurable. That is, a change value of the output voltage of the switching power supply (which may be referred to as a droop voltage) is adjustable as the load current changes for a value. Therefore, in the switching power supplies, a droop voltage generation circuit is usually provided to control a relationship between the load current Iload and the output voltage Vout. That is, the load current is detected to generate a corresponding droop voltage (noted as $V_{droop}$), and the output voltage Vout is regulated by the droop voltage $V_{droop}$.

However, regulation range and regulation accuracy of the load line resistance in existing schemes are limited and cannot meet needs of applications that require high accuracy.

Therefore, it is necessary to provide improved technical solutions to overcome above technical problems in the prior art.

SUMMARY OF THE INVENTION

In view of the above problems, the present disclosure provides a droop voltage generation circuit, a switching power supply and a droop voltage generation method, while using digital to analog converter (DAC) circuit and resistor array to program a load line resistance, so as to achieve higher accuracy and wider range of regulation of the load line resistance with adjustable gain.

According to a first aspect of the present disclosure, there is provided a droop voltage generation circuit for generating a droop voltage according to an output current of a switching power supply. The droop voltage generation circuit includes a reference current generation unit, a first regulation unit and a second regulation unit.

The reference current generation unit is configured to generate a plurality of reference currents according to the output current of the switching power supply.

The first regulation unit is configured to generate a regulation current according to a first regulation code and the plurality of reference currents.

The second regulation unit is configured to generate the droop voltage according to a second regulation code and the regulation current.

Wherein the first regulation code and the second regulation code can be configured at least according to a target value of load line resistance.

Optionally, the droop voltage is positively correlated with at least one of a minimum reference current of the plurality of reference currents, the first regulation code and the second regulation code.

Optionally, the switching power supply comprises one phase of power conversion circuit, and the reference current generation unit includes:

a voltage to current conversion circuit, configured to convert a sampling signal of the output current of the switching power supply into the plurality of reference currents and output the plurality of reference currents.

Optionally, the switching power supply comprises at least two phases of power conversion circuits, and the reference current generation unit includes:

an average circuit, configured to obtain an average voltage signal according to sampling signal of each phase of the power conversion circuit of the switching power supply; and a voltage to current conversion circuit, configured to convert the average voltage signal into the plurality of reference currents and output the plurality of reference currents.

Optionally, the first regulation code is an n-bit digital signal in binary form for regulating an adjustable accuracy of the droop voltage, n is an integer greater than or equal to 1.

Optionally, the plurality of reference currents include a minimum reference current, which is set so that values of the plurality of reference currents are the same and are equal to a value of the minimum reference current, or the values of the plurality of reference currents are proportional to the value of the minimum reference current.

Optionally, the first regulation unit is configured to superimpose any m reference currents to generate the regulation current, m is a positive integer greater than zero.

Optionally, the first regulation unit includes a plurality of second transistors, each of which is coupled between a reference current input terminal of the first regulation unit and an output terminal of the first regulation unit;

the plurality of second transistors are turned on or off in any number according to the first regulation code, so as to couple m reference current input terminals of a plurality of reference current input terminals of the first regulation unit to the output terminal to superimpose m reference currents of the plurality of reference currents.

Optionally, the first regulation unit is a current-type digital-to-analog converter circuit configured to output the regulation current with a sum of m times the minimum reference current according to the first regulation code.

Optionally, the second regulation unit is configured to output a voltage across y resistors which are connected in series according to the second regulation code, so as to obtain the droop voltage, wherein y represents a multiplication of a phase number of the power conversion circuits and an output gain of the switching power supply, and each of the y resistors has a same resistance value.

Optionally, the second regulation unit is further configured to convert the regulation current by coupling only the y resistors into circuit according to the second regulation code.

Optionally, the second regulation unit includes a resistor string, a plurality of third transistors, and a plurality of forth transistors.

Wherein the resistor string has one terminal receiving the regulation current and the other terminal coupled to an output node of a first voltage, the first voltage represents an output voltage of the switching power supply.

The plurality of third transistors have first current terminals respectively coupled to a plurality of intermediate nodes of the resistor string and second current terminals together coupled to an output terminal of the second regulation, each intermediate node of the resistor string is located between two adjacent resistors, one of the plurality of third transistors is turned on according to the second regulation code, so as to output a voltage at one intermediate node of the plurality of intermediate nodes to obtain the droop voltage according to the voltage at one intermediate node and the first voltage.

The plurality of forth transistors have first current terminals receiving the regulation current and second current terminals respectively coupled to the plurality of intermediate nodes of the resistor string, one of the plurality of forth transistors is turned on according to the second regulation code, so as to couple only the y resistors of the resistor string into circuit according to the second regulation code.

According to a second aspect of the present disclosure, there is provided a switching power supply, including N phase power conversion circuits, a buffer configured to output a first voltage, a droop voltage generation circuit, an operational amplifier circuit and a control circuit.

N phase power conversion circuits are coupled in parallel.

A buffer configured to output a first voltage, the first voltage represents an output voltage of the switching power supply.

A droop voltage generation circuit mentioned above is configured to generate a droop voltage according to output currents of the N-phase power conversion circuits and output a feedback signal according to the droop voltage and the first voltage.

An operational amplifier circuit is configured to receive the feedback signal and a reference voltage and output an error compensation signal representing information about error of the feedback signal and the reference voltage.

A control circuit is configured to provide a plurality of control signals to the N phase power conversion circuits according to the error compensation signal.

According to a third aspect of the present disclosure, there is provided droop voltage generation method, including:
generating a plurality of reference currents according to an output current of a switching power supply;
generating a regulation current according to a first regulation code and the plurality of reference currents; and
generating a droop voltage according to a second regulation code and the regulation current,
wherein the first regulation code and the second regulation code can be configured at least according to a target value of load line resistance of the switching power supply.

Optionally, the droop voltage is positively correlated with at least one of a minimum reference current of the plurality of reference currents, the first regulation code and the second regulation code.

Optionally, the plurality of reference currents includes a minimum reference current which is set so that values of the plurality of reference currents are the same and are equal to a value of the minimum reference current; and
a step of generating the regulation current includes:
superimposing any m reference currents of the plurality of reference currents to generate the regulation current according to the first regulation code, m is a decimal value corresponding to the first regulation code.

Optionally, the plurality of reference currents includes a minimum reference current which is set so that values of the plurality of reference currents are proportional to the value of the minimum reference current; and
a step of generating the regulation current includes:
superimposing at least one reference current of the plurality of reference currents according to the first regulation code, so as to output the regulation current with a sum of m times the minimum reference current, m is a positive integer greater than zero.

Optionally, a step of generating the droop voltage includes:
converting the regulation current by selecting y resistors which are connected in series according to the second regulation code, so as to obtain the droop voltage according to a voltage across the y resistors,
wherein y represents a multiplication of a phase number of the power conversion circuits and an output gain of the switching power supply, and each of the y resistors has a same resistance value.

Optionally, a step of generating the droop voltage further includes: converting the regulation current by coupling only the y resistors into circuit according to the second regulation code.

Beneficial effects of the present disclosure include at least:

The embodiments of the present disclosure first superimpose the plurality of reference currents to generate the regulation current, and then allow the regulation current to flow through multiple resistors connected in series to generate the droop voltage. Further, the first regulation unit is configured to regulate the number of reference currents for generating the regulation current according to the first regulation code, and the second regulation unit is configured to regulate the number of resistors through which the regulation currents flow according to the second regulation code. When it is necessary to regulate the droop voltage to obtain the corresponding load line resistance, different regulation accuracies and output gains may be achieved. Higher accuracy may be achieved by setting only a suitable first regulation code (for example, the more bits of the first regulation code, the higher the adjustable accuracy of the droop voltage). In addition, by simply setting the number of total resistors in series in the circuit, a larger regulation range may be achieved with the same values of the reference currents being generated, and the circuit structure is simple.

It should be noted that the above general description and the subsequent detailed description are only exemplary and explanatory and do not limit the present disclosure.

DETAILED DESCRIPTION OF EMBODIMENTS OF THE DISCLOSURE

In order to facilitate an understanding of the present disclosure, the present disclosure will be more fully described below with reference to accompanying drawings. A preferred embodiment of the present disclosure is given in the accompanying drawings. However, the present disclosure may be implemented in different forms and is not limited to the embodiments described herein. Rather, these embodiments are provided for a purpose of providing a more thorough and comprehensive understanding of the present disclosure.

Figure 1:
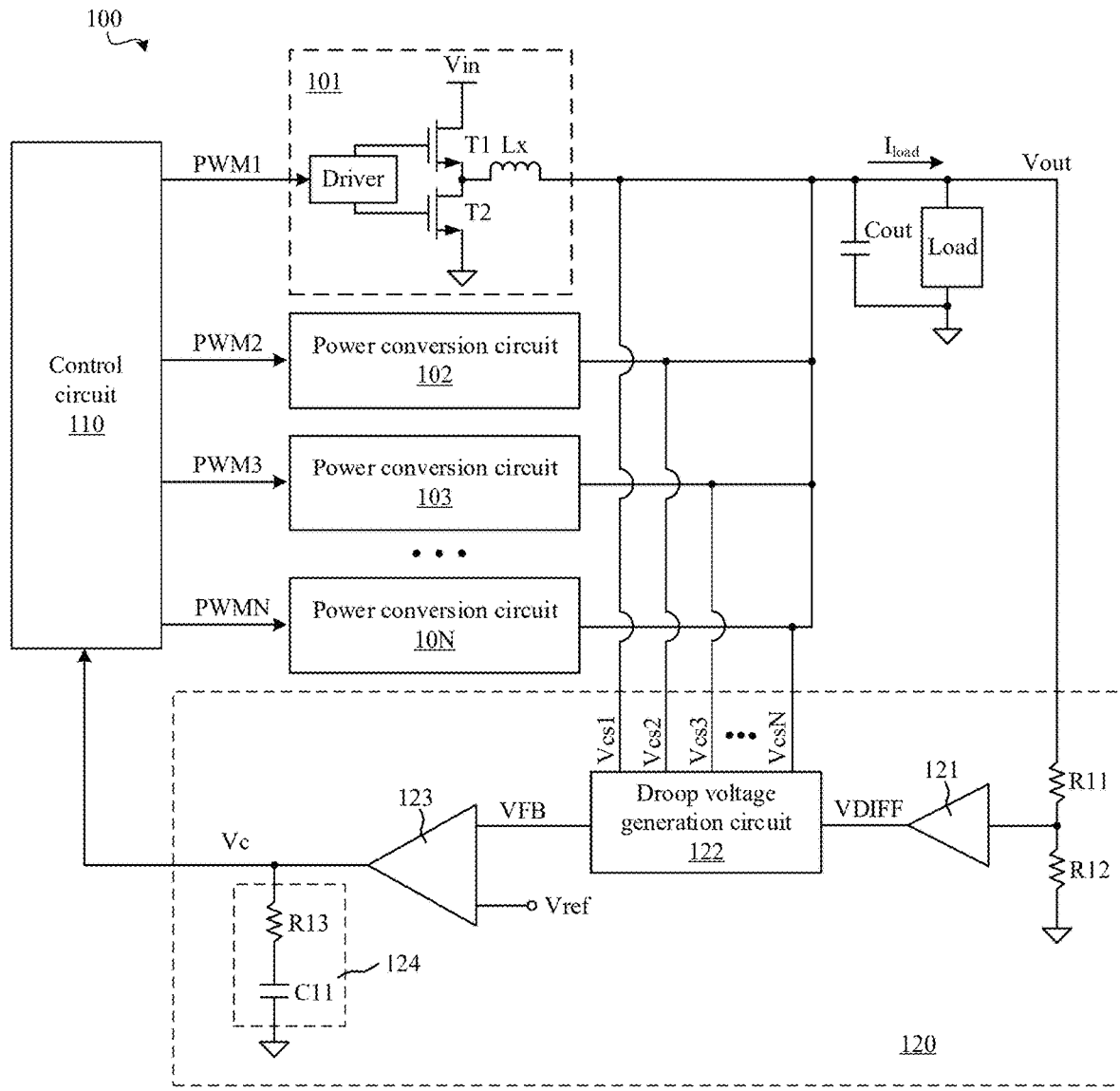
FIG. 1 shows a schematic structure diagram of a switching power supply according to an embodiment of the present disclosure.

FIG. 1 shows a schematic structure diagram of a switching power supply according to an embodiment of the present disclosure. In the embodiment shown in FIG. 1, the switching power supply 100 is illustrated with a power conversion circuit that is greater than three phases. However, it will be understood by those skilled in the art that in other embodiments, the switching power supply 100 may also include power conversion circuits with more phases or fewer phases than the embodiment shown in FIG. 1.

In the embodiment shown in FIG. 1, the switching power supply 100 includes N phase power conversion circuits 101 to 10N coupled in parallel, a control circuit 110, and a feedback regulation circuit 120, wherein N is an integer greater than or equal to 1. For example, each phase power conversion circuit in the N phase power conversion circuits may be, for example, a Buck topology layout including a main transistor (also referred to as an upper-side transistor or a first transistor), a freewheeling transistor (also referred to as a lower-side transistor or a second transistor), and a power inductor. The power conversion circuit 101, for example, includes a main transistor T1, a freewheeling transistor T2, and a power inductor Lx. Wherein, both the main transistor T1 and the freewheeling transistor T2 are, for example, N-Mental-Oxide-Semiconductor (NMOS) transistors. A first current terminal of the main transistor T1 is coupled to an input voltage Vin. A first current terminal of the freewheeling transistor T2 is coupled to a second current terminal of the main transistor T1 to form a switching node, and a second current terminal of the freewheeling transistor T2 is coupled to a reference ground. One terminal of the power inductor Lx is coupled to the switching node between the main transistor T1 and the freewheeling transistor T2, and the other terminal of the power inductor Lx is coupled to an output terminal of the switching power supply 100. Each phase power conversion circuit is driven by a corresponding control signal, and a plurality of control signals control an alternate conduction of the N phase power conversion circuits, thereby output capacitors are alternately charged to generate an output voltage Vout. It is understood that in other examples of the present disclosure, each phase power conversion circuit in the N phase power conversion circuits may also be any other type of power conversion circuit, such as also a Boost type, Flyback type, Buck-Boost type, Cuk type, Sepic type, and Zeta type, and any other type of layout design, which is not limited by the present disclosure.

In the present disclosure, both the main transistor and the freewheeling transistor are transistors operating in a switching mode to provide a current path, including any one selected from a bipolar transistor and a field effect transistor. In one embodiment, when any phase power conversion circuit is in a normal operating state, the freewheeling transistor in the phase power conversion circuit is turned on when the main transistor is turned off. The main transistor and the freewheeling transistor are never turned on at the same time, and there is a dead time between turning on the main transistor and turning on the freewheeling transistor.

The control circuit 110 is configured to generate the plurality of control signals (including PWM1 to PWMN) according to a compensation signal Vc to input a plurality of drivers separately, so that the plurality of drivers generate drive signals separately to operate a plurality of switching groups (each switch group includes but is not limited to the main transistor and the freewheeling transistor) in the N phase power conversion circuits separately. Setting the driver in the corresponding power conversion circuit in FIG. 1 is only an exemplary explanation. A function of the driver is to generate a driving voltage sufficient to drive transistors in the power conversion circuit. If the control signal output by the control circuit 110 itself has a sufficient voltage amplitude, the driver may be omitted or integrated into the control circuit 110. It should be noted that a specific circuit structure and principle used by the control circuit 110 to generate the plurality of control signals PWM1 to PWMN according to the compensation signal Vc may be understood by referring to existing technology, and will not be elaborated in this application.

The feedback regulation circuit 120 is coupled to the power inductor of each phase power conversion circuit and the output terminal of the switching power supply 100, respectively, to detect an output current of each phase power conversion circuit and the output voltage Vout of the switching power supply, respectively, and provide the compensation signal Vc to the control circuit 110 according to the output current and the output voltage Vout.

In some examples of the present disclosure, the feedback regulation circuit 120 includes a buffer 121, a droop voltage generation circuit 122, an operational amplifier 123, and a compensation circuit 124.

The buffer 121 is configured to provide a feedback output terminal of the output voltage Vout. An input terminal of the buffer 121 receives the output voltage Vout of the switching power supply through a resistor R11 and is connected to the reference ground through a resistor R12. The resistor R11 and the resistor R12 are used to divide the output voltage Vout. An output terminal of the buffer 121 outputs a first voltage VDIFF. The first voltage VDIFF may be used to represent the output voltage Vout of the switching power supply 100.

The droop voltage generation circuit 122 is coupled to the power inductor of each phase power conversion circuit to detect the output current of each phase power conversion circuit, so as to provide a droop voltage Vdroop based on the output current being detected. The droop voltage Vdroop is related to a sum of the output currents generated by the N phase power conversion circuits.

In the embodiment of the present disclosure, the droop voltage Vdroop may, for example, be superimposed with the first voltage VDIFF to generate a feedback signal VFB, i.e.

VFB=Vdroop+VDIFF. The feedback signal VFB may be served as a basis for the control circuit 110 to generate the plurality of control signals PWM1 to PWMN, so that the control circuit 110 is capable of regulating the output voltage Vout of the switching power supply 100 according to a change of a load current $I_{load}$, that is, a total output current of the switching power supply 100, when controlling the N phase power conversion circuits. Wherein, a slope of a change of the output voltage Vout of the switching power supply 100 with respect to the load current Iload may be equivalently represented as a load line resistance. Of course, in other examples of the present disclosure, this droop voltage Vdroop may also be provided to other circuits, such as a load circuit (not shown).

A first input terminal of the operational amplifier 123 receives the feedback signal VFB, a second input terminal of the operational amplifier 123 receives a reference voltage Vref, and an output terminal of the operational amplifier 123 is coupled to the compensation circuit 124. The compensation circuit 124 includes, for example, a resistor R13 and a capacitor C11 coupled between the output terminal of the operational amplifier 123 and the reference ground. The operational amplifier 123 outputs an error signal representing information about an error of the feedback signal VFB and the reference voltage Vref, and provides the compensation signal Vc to the control circuit 110 after being compensated by the compensation circuit 124.

Figure 2:
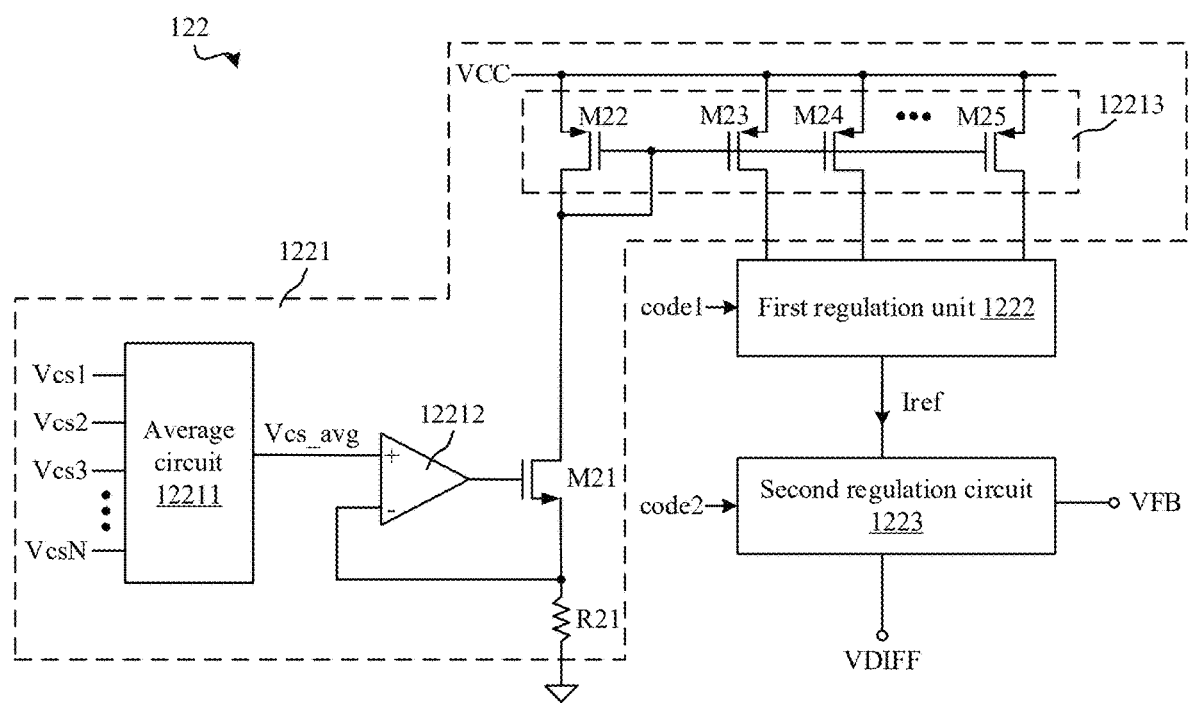
FIG. 2 shows a schematic structure diagram of a droop voltage generation circuit according to an embodiment of the present disclosure.

As shown in FIG. 2, the droop voltage generation circuit 122 includes: a reference current generation unit 1221, a first regulation unit 1222 and a second regulation unit 1223.

The droop voltage generation circuit 122 is configured to generate a plurality of reference currents according to the output current of the switching power supply 100. The first regulation unit is configured to generate a regulation current Iref according to a first regulation code (code1) and the plurality of reference currents. The second regulation unit is configured to generate the droop voltage Vdroop according to a second regulation code (code2) and the regulation current Iref.

In some examples, the plurality of reference currents are obtained by averaging the sampling signal of the output current of each power conversion circuit of the N phase power conversion circuits 101 to 10N. Based on an average current obtained by averaging operation, the total output current (e.g. $I_{load}$) of the switching power supply 100 may be accurately represented by simply multiplying the average current by a phase number (denoted as Npha, and Npha is less than or equal to N) of the power conversion circuits that are actually turned on in the switching power supply 100. That is, even if the phase number of the power conversion circuits that are actually turned on in the switching power supply 100 is changed, the total output current $I_{load}$ of the switching power supply 100 may be represented quickly and accurately based on the average current, so that the circuit has good robustness.

For example, the reference current generation unit includes: an average circuit 12211, an operational amplifier 12212, a first transistor M21, a first resistor R21, and a current mirror 12213. Input terminals of the average circuit 12211 receive the sampling signals Vcs1~VcsN of the output current of each power conversion circuit of the switching power supply 100. An output terminal of the average circuit 12211 outputs an average voltage signal Vcs_avg that represents an average current value of the total output current $I_{load}$ of the switching power supply 100 relative to the phase number Npha of the power conversion circuit actually turned on in the switching power supply 100, i.e., $I_{load}$/Npha. A non-inverting input terminal of the operational amplifier 12212 is connected to the output terminal of the average circuit 12211, an output terminal of the operational amplifier 12212 is connected to a control terminal of the first transistor M21, and an inverting input terminal of the operational amplifier 12212 is connected to a second current terminal of the first transistor M21. A first current terminal of the first transistor M21 is connected to an input terminal of the current mirror 12213, and the second current terminal of the first transistor M21 is connected to the reference ground through a first resistor R21. The plurality of reference currents is output by a plurality of output terminals of the current mirror 12213.

Optionally, the first transistor M21 is any one selected from a bipolar transistor and a field effect transistor. In one embodiment, taken the first transistor M21 being an NMOS transistor for example, the first current terminal of the first transistor M21 corresponds to a drain of the NMOS, the second current terminal of the first transistor M21 corresponds to a source of the NMOS, and the control terminal of the first transistor M21 corresponds to a gate of the NMOS.

It should be understood that the above operational amplifier 12212, the first transistor M21, the first resistor R21, and the current mirror 12213 may achieve a conversion of the average voltage signal Vcs_avg from voltage to current. Thus in other examples of the present disclosure, other voltage to current conversion circuits may also be used to convert the average voltage signal Vcs_avg into the plurality of reference currents and output them.

In other examples, when the phase number N of the power conversion circuits of the switching power supply 100 is 1 (i.e., the switching power supply 100 is a single-phase switching power supply), no averaging circuit 12211 may be provided in the reference current generation unit 1221. In this case, the plurality of reference currents are obtained by sampling the output current of the switching power supply 100. The non-inverting input terminal of the operational amplifier 12212 may receive the sampling signal of the output current of the switching power supply 100 directly.

The current mirror 12213 includes a plurality of transistors (not limited to including M22 to M25, wherein M22 to M25 are used only to identify transistors drawn in the accompanying drawings and are not used to limit the number of transistors in the current mirror). First current terminals of the plurality of transistors are all coupled to a power supply voltage VCC, control terminals of the plurality of transistors are all coupled to each other, and a second current terminal of transistor M22 is the input terminal of the current mirror 12213, second current terminals of transistors M23 to M25 are a plurality of output terminals of the current mirror 12213 for outputting the plurality of reference currents, respectively. Optionally, each of transistors M22 to M25 is any one selected from a bipolar transistor and a field effect transistor. And in one embodiment, taken transistors M22~M25 being P-Mental-Oxide-Semiconductor (PMOS) transistors for example, the first current terminals of transistors M22~M25 correspond to sources of PMOS transistors, the second current terminals of transistors M22~M25 correspond to drains of PMOS transistors, and the control terminals of transistors correspond to gates of PMOS transistors.

By using the plurality of transistors M22 to M25 with a suitable manufacturing process, such as a plurality of transistors having a suitable aspect ratio, it is possible to have a suitable ratio, such as k:1, k is greater than 1, between an input current (i.e., a current flowing through the transistor M22) of the current mirror 12213 and the plurality of reference currents (i.e., the current flowing through the transistors M23 to M25) being output by the current mirror 12213. It should be understood that, compared to a way of serving the total output current of the switching power supply 100 as the input current of the current mirror 12213, the present disclosure may obtain the plurality of reference currents based on the average current $I_{load}$/Npha of the N phase power conversion circuits, and may also obtain a smaller reference current under a same process conditions, so as to be conducive to achieving a higher regulation accuracy.

The first regulation unit 1222 is specifically configured to output the regulation current Iref with a sum of m times the minimum reference current (noted as Imin) according to the first regulation code (code1). m is a decimal value corresponding to the first regulation code (code1), and m is a positive integer. That is, Iref=m*Imin.

Optionally, the first regulation (code1) is, for example, an n-bit digital signal in binary form, which may be used to adjust an adjustable accuracy of the droop voltage Vdroop and/or the load line resistance, and n is an integer greater than or equal to 1.

In some examples of the present disclosure, current value of each reference current of the plurality of reference currents is the same, for example, each reference current is equal to the minimum reference current Imin. That is, a ratio between the input current of the current mirror 12213 and each output reference current is, for example, k:1, with k being greater than 1. It is understood that the larger a value of k, the greater a maximum regulation accuracy that may be achieved when the input current of the current mirror 12213 is fixed. In this way, the plurality of transistors M23 to M25 with the same size may be used in the reference current generation unit 1221 to output the plurality of reference currents that are the same, so as to be conducive to reducing complexity of design and manufacture and improving an output accuracy of the plurality of reference currents.

In this example, the first regulation unit 1222 is configured to superimpose any m reference currents according to the first regulation (code1) to generate the regulation current Iref. In this case, for example, the first regulation unit 1222 may include a first decoder and a plurality of second transistors. The first decoder is used to generate control signals for the plurality of second transistors according to the first regulation code (code1), each of which is coupled between a reference current input and a common output terminal of the first regulation unit 1222. The plurality of second transistors is capable of being turned on or off according to the first regulation code (code1), so as to couple m reference currents of the plurality of reference current input terminals of the first regulation unit 1222 to the output terminal of the first regulation unit and achieve superimposed output terminal of m reference currents of the plurality of reference currents. Each reference current input terminal of the first regulating unit 1222 corresponds to receiving a reference current, and the common output terminal of the first regulating unit 1222 is used to output a regulation current Iref.

For example, when the first regulation (code1) is "00001010", the m corresponding to the first regulation code (code1) is equal to 10, and the plurality of second transistors may conduct 10 according to the first regulation code (code1), so that the first regulation unit 1222 is capable of outputting the regulation current Iref 10 times the minimum reference current Imin.

In other examples of the present disclosure, current values of at least some of the plurality of reference currents are different. In a specific example, if the values of the plurality of reference currents are arranged in order from largest to smallest, a ratio of the current values of any two adjacent reference currents of the plurality of reference currents is 2. In this embodiment, the ratio of the smallest reference current of the plurality of reference currents to the input current of the current mirror 12213 is, for example, k:1. The plurality of reference currents are in one-to-one correspondence with n bits of the first regulation code (code1). In this way, the minimum reference current combination of 0 to 2n times is capable of being output by the reference current generation unit 1221 with only fewer transistors, which is conducive to reducing design costs and achieving miniaturization of the circuit.

In this embodiment, the first regulation unit 1222 is, for example, a current-type digital-to-analog converter circuit including a second decoder and n second transistors, and the second decoder is used to generate control signals for n second transistors according to the first regulation code, and each second transistor is connected between a reference current input and a common output terminal of the first regulation unit 1222, respectively. The first regulating unit 1222 is configured to output the regulation current with a sum of m times the minimum reference current according to the first regulating code.

For example, when the first regulation code (code1) is "00001010", m of this first regulation code (code1) is equal to 10. In this case, the n second transistors may, under the control of the control signal output by the second decoder, turn on the second transistors connected between the reference current input for receiving 2 times the minimum reference current Imin and the output terminal of the first regulation unit and turn on the second transistors connected between the reference current input for receiving 8 times the minimum reference current Imin and the output terminal of the first regulation unit, so that the first regulation unit 1222 is capable of outputting the regulation current Iref that is 10 times the minimum reference current Imin.

Figure 3:
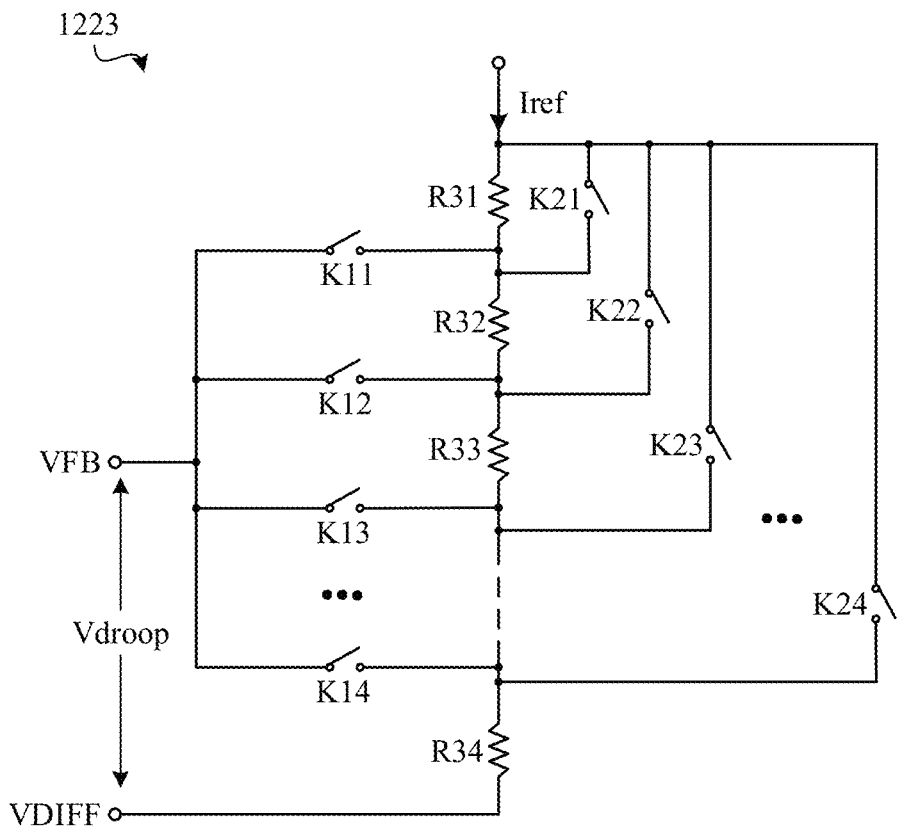
FIG. 3 shows a schematic structure diagram of a second regulation unit in FIG. 2.
Figure 4:
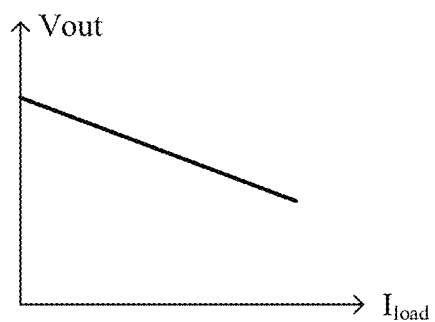
FIG. 4 shows a curve diagram of a relationship between a load current and an output voltage of a switching power supply according to an embodiment of the present disclosure.

Referring to FIG. 3, the second regulation unit 1223 includes a resistor string formed by a plurality of resistors having the same resistance value (not limited to including resistors R31 to R34, wherein, R31 to R34 are used only to identify the resistors shown in FIG. 3 and are not used to limit the number of resistors in the second regulation unit 1223) connected in series. One end of the resistor string receives the regulation current Iref and the other end is coupled to an output node of the first voltage VDIFF, i.e. corresponding to the output terminal of the operational amplifier 121 in FIG. 1. The second regulation unit 1223 is configured to obtain the droop voltage Vdroop by outputting a voltage across y resistors of the plurality of resistors connected in series according to the second regulation code (code2). y is a decimal value corresponding to the second regulation code (code2) and may be used to represent a product of the phase number Npha of the power conversion circuits that are actually turned on in the switching power supply and an output gain (noted as Gain) of the droop voltage generation circuit, e.g. y=Npha*(Gain). Optionally, the second regulation code (code2) may be set as a digital signal in binary form, or directly as a decimal value.

In a preferred example, the second regulation unit 1223 is further configured to convert the regulation current Iref by connecting only y resistors to the circuit according to the second regulation code (code2). In this way, the number of resistors through which the regulation current Iref flows may be reduced while the voltage drop across the y resistors may be obtained, thereby facilitating reduction of voltage margin required for the circuit.

For example, as shown in FIG. 3, the second regulation unit 1223 further includes a plurality of third transistors (not limited to including transistors K11 to K14, wherein K11 to K14 are used to identify the third transistors shown in FIG. 3 and are not used to limit the number of third transistors in the second regulation unit 1223) and a plurality of fourth transistors (not limited to including transistors K21 to K24, wherein K21 to K24 are used to identify the fourth transistor shown in FIG. 3 and are not used to limit the number of the fourth transistor in the second regulation unit 1223). First current terminals of the plurality of third transistors K11 to K14 are each connected to a plurality of intermediate nodes of the resistor string, and second current terminals of the plurality of third transistors K11 to K14 are each connected to the output terminal of the second regulation unit 1223. Each intermediate node of the resistor string is connected to one end of a resistor. One of the transistors K11 to K14 may be turned on according to the second regulation code (code2), so as to output the voltage across y resistors to obtain the droop voltage Vdroop. For example, assuming that there are five resistors in series between the third transistor K13 and the output node of the first voltage VDIFF, when the third transistor K13 is controlled to be turned on, a voltage across the five resistors may be output as the drop voltage Vdroop. Meanwhile, in combination with FIG. 1 and FIG. 3, one end of the resistor string is directly connected to the output terminal of the buffer 121 (i.e., the output node of the first voltage VDIFF), so as to superimpose the first voltage VDIFF and the droop voltage Vdroop easily, i.e., when a corresponding third transistor is turned on, it may be directly connected to the second regulation unit based on the third transistor that is turned on. When the corresponding third transistor is turned on, the feedback signal VFB may be obtained directly at the output terminal of the second regulation unit 1223 based on the third transistor that is turned on.

First current terminals of the plurality of fourth transistors K21 to K24 receive the regulation current Iref, and second current terminals of the plurality of fourth transistors K21 to K24 are connected to the plurality of intermediate nodes of the resistor string, and at least one of the plurality of fourth transistors K21 to K24 may be turned on according to the second regulation code (code2), so that only y resistors in the resistor string are connected to the circuit to convert the reference the regulation current Iref.

The present disclosure converts the regulation current Iref from a current signal to a voltage signal by setting the regulation current Iref to flow through a plurality of resistors R31 to R34, and a voltage across a specific number of resistors may be obtained by performing a voltage interception at a specific intermediate node of the resistor string. In this way, the voltage across the resistors may be obtained by selecting the intermediate node, i.e., it is easy to obtain different droop voltages Vdroop at the same output current of the switching power supply 100, and the circuit is flexible, accurate and simple.

It should be understood that a total number of resistors contained in the resistor string corresponds to an adjustable range for adjusting the droop voltage Vdroop at the same output current. In some examples, this adjustable range may be determined by the second adjustment code (code2), that is, by the product of the phase number N of the power conversion circuits in the switching power supply 100 and a desired maximum adjustable gain (Gain). For example, assuming that adjustable values of the phase number of the power conversion circuits in the switching power supply are {0,1,2,3,4,5,6,7,8} and the adjustable values of the gain (Gain) are {1,2,4,8}, there should be at least 8*8=64 resistors in series in the resistor string of the second regulation unit 1223.

When a circuit structure of the switching power supply 100 is determined (including, but limited to, a circuit structure of the droop voltage generation circuit 122 therein is also determined), the adjustable range of the switching power supply 100 for the droop voltage Vdroop or for the load line resistance is also substantially determined.

Based on the above description, it is clear that the droop voltage Vdroop generated based on the technical solution of the present disclosure may be obtained by following formula:

$$V\text{droop}=I\text{ref}*y=(I\min*m)*(N\text{pha}*\text{Gain}) \quad (1).$$

That is, the droop voltage Vdroop is positively correlated with at least one of the minimum value Imin of the plurality of reference currents, the decimal value m corresponding to the first regulation code (code1) and the decimal value y corresponding to the second regulation code (code2). Further, after the circuit structure of the switching power supply 100 is determined, different droop voltages Vdroop may be obtained with the same output current Iload by setting different first regulation codes (code1) and/or different second regulation codes (code2).

In the present disclosure, the first regulation code (code1) and the second regulation code (code2) can be configured at least according to a target value of the load line resistance. In other words, after determining a value of the load line resistance, the system may generate a corresponding first adjustment code (code1) and a corresponding second adjustment code (code2) based on the value of the load line resistance. So that the droop voltage generation circuit 122 generates a corresponding droop voltage Vdroop according to the first adjustment code (code1), the second adjustment code (code2) and the output current $I_{load}$ of the switching power supply, superimposes the droop voltage Vdroop and the first voltage VDIFF, and feeds back a superimpose result to the control circuit 110, so as to as to adjust the output voltage Vout according to the output current $I_{load}$, thus achieving the adjustment of the ratio of the output voltage Vout to the output current $I_{load}$ and equivalently obtaining the load line resistance that is desired. The present disclosure enables higher accuracy and wider range adjustment of the load line resistance with adjustable gain.

In some examples, the second adjustment code (code2) is also determined based on the phase number N of the power conversion circuits contained in the switching power supply 100 and the adjustable value of the gain (Gain). For example, suppose the phase number N of the power conversion circuits contained in the switching power supply 100 is equal to 8, and the adjustable values of the gain (Gain) only include 1,2,4 and 8, and thus the second adjustment code (code2) may be determined based only on a result of all possible products of {1,2,3,4,5,6,7,8} and {1,2,4,8}. Thus, after determining the second adjustment code (code2) based on the target value of the load line resistance, the phase number N of the power conversion circuit of the switching power supply 100 and the adjustable values of gain (Gain), the first adjustment code (code1) may be determined based on the target value of the load line resistance and the second adjustment code (code2) that is determined.

Figure 5:
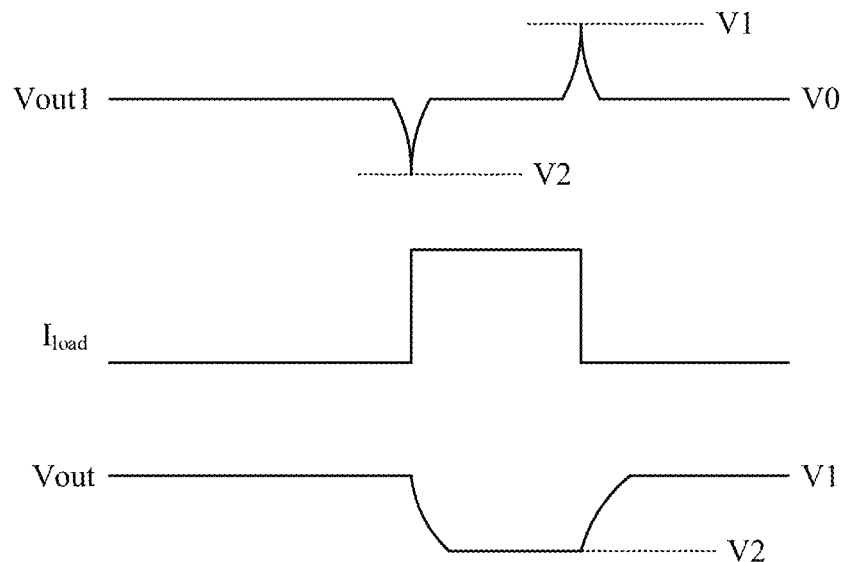
FIG. 5 shows a schematic waveform diagram of a load current and an output voltage of a switching power supply according to an embodiment of the present disclosure.

FIG. 5 shows a schematic waveform diagram of a load current and an output voltage of a switching power supply according to an embodiment of the present disclosure. Wherein, $I_{load}$ represents a curve of the load current variation, Vout1 represents a curve of voltage variation with load current of an existing switching power supply, and Vout represents a curve of output voltage variation with load current of the switching power supply 100 disclosed in the embodiment of the present disclosure.

When the load current $I_{load}$ changes due to pumping or unloading, etc., the output voltage of the switching power supply will also change down or overshoot accordingly. For a central processing unit (CPU), power consumption is very high and load jump rate is very fast. Therefore, when the load current $I_{load}$ changes, the output voltage of the switching power supply will change by a very large amount. For an existing solution, the output voltage Vout1 of the switching power supply may only vary between V0 to V2 or V0 to V1 when the load jumps, i.e., when the load current $I_{load}$ changes. In the present disclosure, by setting the droop voltage generation circuit 122, the output voltage Vout of the switching power supply 100 may be stabilized at a larger voltage such as V1 when the load is small and at a smaller voltage value such as V2 when the load is large. Wherein, V1 is greater than V0 and V0 is greater than V2.

As may be seen from FIG. 5, the technical solution of the present disclosure, compared to the prior art, allows the output voltage Vout of the switching power supply 100 to vary from V1 to V2 under the same load jump, which is capable of obtaining a response of the switching power supply 100 to the load jump with more tolerance.

Figure 6:
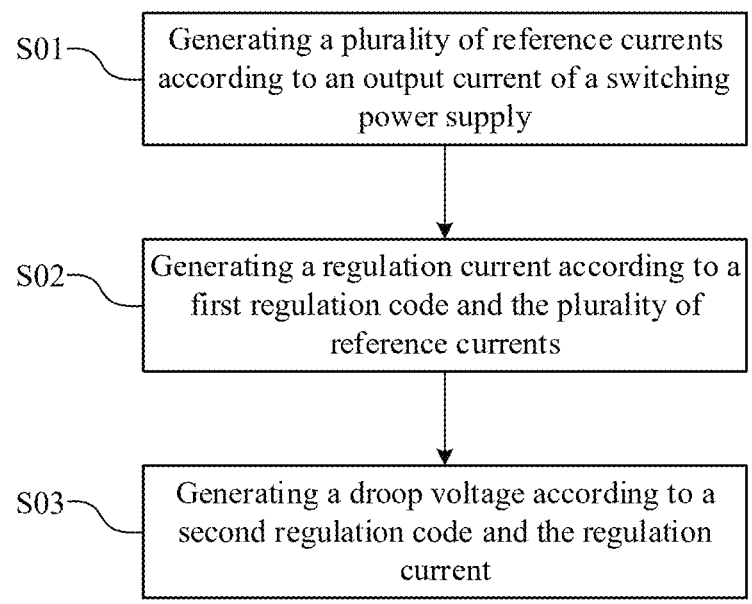
FIG. 6 shows a flow diagram of a droop voltage generation method according to an embodiment of the present disclosure.

Further, the present disclosure also discloses a droop voltage generation method. The method may be applied to the droop voltage generation circuit as shown in FIGS. 1 to 5, and as shown in FIG. 6, the method includes performing the following steps:

In step S01, generating a plurality of reference currents according to an output current of a switching power supply. In this embodiment, an operation of step S01 may be understood with reference to the previous description of the reference current generation unit 1221, and will not be repeated here.

In step S02, generating a regulation current according to a first regulation code and the plurality of reference currents.

In some examples, the plurality of reference currents include a minimum reference current, which is set so that values of the plurality of reference currents are the same and are equal to a value of the minimum reference current. In this case, step S02 includes: superimposing any m reference currents of the plurality of reference currents to generate the regulation current according to the first regulation code. m is a decimal value corresponding to the first regulation code.

In other examples, current values of at least some of the plurality of reference currents are different. For example, the plurality of reference currents include a minimum reference current, which is set so that values of the plurality of reference currents are proportional to the value of the minimum reference current. In a specific example, if the values of the plurality of reference currents are arranged in order from largest to smallest, a ratio between any two adjacent reference currents of the plurality of reference currents is 2. In this case, step S02 includes: superimposing at least one reference current of the plurality of reference currents according to the first regulation code, so as to output the regulation current with a sum of m times the minimum reference current.

In step S03, generating a droop voltage according to a second regulation code and the regulation current.

In the present embodiment, step S03 includes: converting the regulation current by selecting y resistors which are connected in series according to the second regulation code, so as to obtain the droop voltage according to a voltage across the y resistors. Here, y represents a multiplication of a phase number of the power conversion circuits and an output gain of the switching power supply, and each of the y resistors has a same resistance value.

In a specific example, step S03 further includes: converting the regulation current by coupling only the y resistors into circuit according to the second regulation code.

In the present disclosure, the droop voltage is positively correlated with at least one of a minimum reference current of the plurality of reference currents, the first regulation code and the second regulation code. The first regulation code and the second regulation code can be configured at least according to a target value of load line resistance of the switching power supply.

In this embodiment, a specific operation of the various steps in the droop voltage generation method may be referred to the various embodiments of the droop voltage generation circuit described previously and will not be repeated here.

Finally, it should be noted that it is clear that the above embodiments are merely examples for the purpose of clearly illustrating the disclosure and are not a limitation on the manner of implementation. For a person of ordinary skill in the art, there are other variations or changes that can be made in different forms based on the above description. It is not necessary or possible to exhaust all embodiments here. The obvious variations or changes derived therefrom are still within the scope of protection of the disclosure.

The invention claimed is:

1. A droop voltage generation circuit for generating a droop voltage according to an output current of a switching power supply, comprising:
   a reference current generation unit configured to generate a plurality of reference currents according to the output current of the switching power supply;
   a first regulation unit configured to generate a regulation current according to a first regulation code and the plurality of reference currents; and
   a second regulation unit configured to generate the droop voltage according to a second regulation code and the regulation current,
   wherein the first regulation code and the second regulation code can be configured at least according to a target value of load line resistance,
   the switching power supply comprises at least two phases of power conversion circuits, and the reference current generation unit comprises:
   an average circuit, configured to obtain an average voltage signal by sampling each phase of the power conversion circuit of the switching power supply; and
   a voltage to current conversion circuit, configured to convert the average voltage signal into the plurality of reference currents and output the plurality of reference currents.

2. The droop voltage generation circuit according to claim 1, wherein the droop voltage is positively correlated with at least one of a minimum reference current of the plurality of reference currents, the first regulation code and the second regulation code.

3. The droop voltage generation circuit according to claim 1, wherein the first regulation code is an n-bit digital signal in binary form for regulating an adjustable accuracy of the droop voltage, n is an integer greater than or equal to 1.

4. The droop voltage generation circuit according to claim 3, wherein the plurality of reference currents include a minimum reference current, which is set so that values of the plurality of reference currents are the same and are equal to a value of the minimum reference current, or the values of the plurality of reference currents are proportional to the value of the minimum reference current.

5. The droop voltage generation circuit according to claim 4, wherein the first regulation unit is configured to superimpose any m reference currents to generate the regulation current, m is a positive integer greater than zero.

6. The droop voltage generation circuit according to claim 5, wherein the first regulation unit comprises a plurality of second transistors, each of which is coupled between a reference current input terminal of the first regulation unit and a output terminal of the first regulation unit;
the plurality of second transistors are turned on or off in any number according to the first regulation code, so as to couple the m reference current input terminal of the plurality of reference current input terminals of the first regulation unit to the output terminal to superimpose the m reference currents.

7. The droop voltage generation circuit according to claim 4, wherein the first regulation unit is a current-type digital-to-analog converter circuit configured to output the regulation current with a sum of m times the minimum reference current according to the first regulation code.

8. The droop voltage generation circuit according to claim 1, wherein the second regulation unit is configured to output a voltage across y resistors which are connected in series according to the second regulation code, so as to obtain the droop voltage,
wherein y represents a multiplication of a phase number of the power conversion circuits and an output gain of the switching power supply, and each of the y resistors has a same resistance value.

9. The droop voltage generation circuit according to claim 8, wherein the second regulation unit is further configured to couple only the y resistors into circuit according to the second regulation code to convert the reference current.

10. The droop voltage generation circuit according to claim 9, wherein the second regulation unit comprises a resistor string, a plurality of third transistors, and a plurality of fourth transistors,
wherein the resistor string has one terminal receiving the regulation current and the other terminal coupled to an output node of a first voltage, the first voltage represents an output voltage of the switching power supply;
the plurality of third transistors have first current terminals respectively coupled to a plurality of intermediate nodes of the resistor string and second current terminals together coupled to an output terminal of the second regulation, each intermediate node of the resistor string is located between two adjacent resistors, one of the plurality of third transistors is turned on according to the second regulation code, so as to output a voltage at one intermediate node of the plurality of intermediate nodes to obtain the droop voltage according to the voltage at one intermediate node and the first voltage;
the plurality of fourth transistors have first current terminals receiving the regulation current and second current terminals respectively coupled to the plurality of intermediate nodes of the resistor string, one of the plurality of fourth transistors is turned on according to the second regulation code, so as to couple only the y resistors of the resistor string into circuit according to the second regulation code.

11. A switching power supply, comprising:
N phase power conversion circuits coupled in parallel;
a buffer configured to output a first voltage, the first voltage represents an output voltage of the switching power supply;
a droop voltage generation circuit according to claim 1, configured to generate a droop voltage according to output currents of the N-phase power conversion circuits and output a feedback signal according to the droop voltage and the first voltage;
an operational amplifier circuit configured to receive the feedback signal and a reference voltage and output an error compensation signal representing information about error of the feedback signal and the reference voltage; and
a control circuit configured to provide a plurality of control signals to the N phase power conversion circuits according to the error compensation signal.

12. A droop voltage generation method, comprising:
generating a plurality of reference currents according to an output current of a switching power supply;
generating a regulation current according to a first regulation code and the plurality of reference currents; and
generating a droop voltage according to a second regulation code and the regulation current,
wherein the first regulation code and the second regulation code can be configured at least according to a target value of load line resistance of the switching power supply,
the switching power supply comprises at least two phases of power conversion circuits, and generating a plurality of reference currents according to an output current of a switching power supply comprises:
obtaining an average voltage signal by sampling each phase of the power conversion circuit of the switching power supply; and
converting the average voltage signal into the plurality of reference currents and output the plurality of reference currents.

13. The droop voltage generation method according to claim 12, wherein the droop voltage is positively correlated with at least one of a minimum reference current of the plurality of reference currents, the first regulation code and the second regulation code.

14. The droop voltage generation method according to claim 12, wherein the plurality of reference currents includes a minimum reference current which is set so that values of the plurality of reference currents are the same and are equal to a value of the minimum reference current; and
a step of generating the regulation current comprises:
superimposing any m reference currents of the plurality of reference currents to generate the regulation current according to the first regulation code, m is a decimal value corresponding to the first regulation code.

15. The droop voltage generation method according to claim 12, wherein the plurality of reference currents includes a minimum reference current which is set so that values of the plurality of reference currents are proportional to the value of the minimum reference current; and
a step of generating the regulation current comprises:
superimposing at least one reference current of the plurality of reference currents according to the first regulation code, so as to output the regulation current with a sum of m times the minimum reference current, m is a positive integer greater than zero.

16. The droop voltage generation method according to claim 12, wherein a step of generating the droop voltage comprises:
- converting the regulation current by selecting y resistors which are connected in series according to the second regulation code, so as to obtain the droop voltage according to a voltage across the y resistors,
- wherein y represents a multiplication of a phase number of the power conversion circuits and an output gain of the switching power supply, and each of the y resistors has a same resistance value.

17. The droop voltage generation method according to claim 16, wherein a step of generating the droop voltage further comprises:
- converting the regulation current by coupling only the y resistors into circuit according to the second regulation code.

* * * * *